United States Patent Office 2,858,270
Patented Oct. 28, 1958

2,858,270
DRILLING FLUID COMPOSITION AND METHOD

William M. Harrison, Ventura, Calif.

No Drawing. Application May 2, 1955
Serial No. 505,543

13 Claims. (Cl. 252—8.5)

This invention relates to the art of drilling wells, and has particular reference to a drilling fluid composition and method for use thereof.

The rotary drilling of oil and gas wells requires the use of a drilling fluid or mud which consists of a suspension in a base of water or oil, or water and oil, of a material such as clays or blown asphalt, and weight materials such as barytes, galena, iron oxide, etc. The drilling fluid is introduced through the hollow drilling stem and is released into the well hole or bore from openings in the drilling bit, from whence it is pumped back to the surface for recirculation. These drilling fluids perform the function of lubricating and cooling the drilling bit, carrying the cuttings up to the surface, furnishing a static head to overcome formation pressures, and they form on the walls of the bore hole a substantially impervious sheath or filter cake to prevent the loss of fluid into the formation.

Oil based and oil emulsion drilling fluids have become increasingly more popular in the petroleum industry, particularly with the advent of deep hole drilling, production for hydratable clay formations, drilling through sloughing shale formations, and prevention of water blocks in finishing holes. However, since most weight materials used in such drilling fluids, such as barytes and iron oxide are hydrophilic in nature, the weight material mut be very finely divided so that Brownian movement will tend to prevent the material from settling out of the fluid whenever velocity is lowered or lost. This finely divided state results in an enormous surface area for a given weight of material, and the material is easily hydrolyzed if water is encountered during drilling operations. This results in agglomeration of the weight material, subsequent settling out and even freezing up of the drill pipe in some cases. One of the principal objects of this invention is to provide a novel drilling fluid composition which is not subject to these and other disadvantages of those used heretofore.

Another object of this invention is to provide novel oil based and oil emulsion drilling fluids wherein the weight material particles are rendered oleophilic and water repellent.

Other objects and advantages of this invention it is believed will be readily apparent from the following detailed description of preferred embodiments thereof.

Briefly, this invention comprehends within its scope the discovery that greatly improved oil-containing drilling fluids are produced utilizing weight material particles which are coated with bituminous materials, such materials being oleophilic and thus tending to keep the weight material suspended in the oil-containing drilling fluid. Hydrolysis of the weight material is prevented by the surface coating thereon and thus any tendency of the weight material to agglomerate and settle out in the presence of water is eliminated. As used in the specification and claims herein, the term "bituminous materials" is intended to include bitumin, its by-products, natural asphalts, air-blown asphalts and refined asphalts.

There are many methods for coating particulite materials with bituminous materials, such methods having been used for many years in the preparation of road gravels, and these methods are suitable for use in preparting the novel weight material utilized in the present invention. One of the simplest methods is to merely heat the bituminous material and add the weight material to the melted mass. After cooling and setting up of the mixture it is chilled and ground to produce the coated material. This simple process is difficult to carry out unless blown asphalt or a natural asphalt of low ductility such as gilsonite is used, and even with this material care must be taken during the grinding or milling of the mixture to prevent lumping of the weight material and incomplete coating of the particles. This method results in a relatively thick coating of the asphalt. However, since the product can be substituted volume for volume with blown asphalt in a drilling mud, the resulting mud has a higher specific gravity than those in use today.

Another method of preparing the weight material comprises injection of the weight material into a spray of the bituminous material which is dissolved in a volatile solvent and the solvent flushed off while falling through a blast of hot air. The product is then kiln dried to remove last traces of solvent. This material is superior from the standpoint of controlling the coating thickness, but requires careful removal of all solvent to prevent tackiness in the final product. Additionally, solvent costs may be excessive unless vapor recovery systems are installed. However, this method has been utilized for many years in the preparation of road gravels and is quite suitable for the preparation of asphalt-coated weight materials within the scope of the present invention.

Yet another method comprises blowing natural asphalt in the conventional manner and introducing the weight material during oxidation so that mixture is complete. Thus, a heavy oil or asphalt is heated to about 300° F. or higher to melt the oil or asphalt, and hot air is blown through the mass at a rate of 300 cubic feet per barrel per hour. The weight material is sifted into the mass, the amount being added depending upon the particle size and the desired final specific gravity. The asphalt becomes hard and brittle due to the oxidation and the mixture can then be milled in any conventional manner to produce the coated weight material. It is preferred to air classify the coated material to eliminate any excess asphalt not present as part of the coating.

From the above description it will be apparent that various methods are available for producing a bituminous-coated weight material suitable for use in the instant invention, and, depending upon the process used and the control of the process, the particle size and coating thickness may be varied to obtain the properties desired in the drilling fluid. The following specific example of the invention is a modification of the first basic method described above: In carrying out this example, a natural asphalt of the type used in the coating of pipes was utilized. This asphalt had a low melting point (initial 240° F.) and a very low ductility, thus being extremely friable and suitable for grinding. Three parts of this asphalt were broken up into small bits ½ inch or smaller and a portion thereof placed in a metal container so as to cover the bottom thereof. The container was heated to melt the asphalt and as soon as this occurred barytes were sifted in with stirring. Additional portions of asphalt and barytes were added alternately, keeping the solution just above the melting point, and roughly maintaining the weight ratio of barytes to asphalt at 3:1. The thick paste mixture was poured onto a metal sheet, cooled with water, and the solidified sheet was then broken up into small chunks and ground in a chilled mortar and pestle. The powder was dropped through a flame into water several times in order to melt the asphalt coating and to cover any exposed areas of the barytes particles, and also to oxidize the outer surfaces of the coating to render it more insoluble in the oil of the drilling fluid. The powder was then mixed with an inert filler (clay, 50% by weight) and sacked ready for use. It should be noted that the ratio of barytes to asphalt may be decreased or increased according to demand for drilling and according to particle size desired.

Bituminous-coated weight materials may be utilized in the same manner as conventional weight materials in carrying out this invention. Thus, as a specific example, a highly satisfactory oil-base drilling fluid is prepared by adding the asphalt-coated barytes, prepared in accordance with the above example, to a 20° A. P. I. gravity California crude oil. The amount of weight material varies, as with conventional weight materials, depending upon the desired properties of the fluid. Sufficient weight material may be added to result in a fluid weighing up to 133 pounds per cubic foot or higher. Those skilled in the art will understand that the fluid may contain conventional emulsifying or suspending agents, saponifying agents, and agents to control the viscosity and gel strength of the fluid. It will be readily apparent that the weight material may also be utilized in emulsion drilling fluids. The term "oil" as used herein and in the claims is intended to include fractions such as diesel fuel, kerosenes and the like.

It is believed readily apparent from the above description that the invention is not limited to the use of any specific type of bituminous or asphaltic material. Thus, even low-melting natural asphalts may be used if they are blown or oxidized, at least on the coating surfaces, to render the coating sufficiently insoluble in the oil phase of the drilling mud to prevent excessive removal of the coating while in use. If the coating is not pre-blown or is not oxidized during the coating process, the melting point of the natural asphalt used should be above about 550° F. to avoid excessive dissolving of the asphalt coating in all types of oils.

Having fully described my invention, it is to be understood that I do not wish to be limited to the details set forth, but my invention is of the full scope of the appended claims.

I claim:

1. A drilling fluid composition including an oil and discrete particles of a weight material suspended therein, the particles of said weight material being coated with a bituminous material selected from the group consisting of bitumin, natural asphalts, blown asphalts and refined asphalts.

2. A drilling fluid composition including an oil and discrete particles of a weight material suspended therein, the particles of said weight material being coated with asphalt.

3. A drilling fluid composition including an oil and discrete particles of a weight material suspended therein, the particles of said weight material being coated with blown asphalt.

4. A drilling fluid composition including an oil and discrete particles of a weight material suspended therein, the particles of said weight material being coated with asphalt, the surfaces of said asphalt being oxidized.

5. In a process for drilling wells with well-drilling tools wherein there is circulated a drilling fluid, the steps comprising adding to the well a drilling fluid including an oil and a weight material, the particles of which weight material are coated with a bituminous material selected from the group consisting of bitumin, natural asphalts, blow asphalts and refined asphalts, and circulating said drilling fluid through the well during the drilling thereof.

6. In a process for drilling wells with well-drilling tools wherein there is circulated a drilling fluid, the steps comprising adding to the well a drilling fluid including an oil and a weight material, the particles of which weight material are coated with asphalt, and circulating said drilling fluid through the well during the drilling thereof.

7. In a process for drilling wells with well-drilling tools wherein there is circulated a drilling fluid, the steps comprising adding to the well a drilling fluid including an oil and a weight material, the particles of which weight material are coated with blown asphalt, and circulating said drilling fluid through the well during the drilling thereof.

8. In a process for drilling wells with well-drilling tools wherein there is circulated a drilling fluid, the steps comprising adding to the well a drilling fluid including an oil and a weight material, the particles of which weight material are coated with asphalt, the surfaces of said asphalt being oxidized, and circulating said drilling fluid through the well during the drilling thereof.

9. A drilling fluid composition including an oil and discrete particles of an hydrophilic weight material suspended therein, the particles of said weight material being coated with a bituminous material selected from the group consisting of bitumin, natural asphalts, blown asphalts and refined asphalts.

10. A drilling fluid composition including an oil and discrete particles of an hydrophilic weight material suspended therein, the particles of said weight material being coated with blown asphalt.

11. A drilling fluid composition including an oil and discrete particles of an hydrophilic weight material suspended therein, the particles of said weight material being coated with asphalt, the surfaces of said asphalt being oxidized.

12. In a process for drilling wells with well-drilling tools wherein there is circulated a drilling fluid, the steps comprising adding to the well a drilling fluid including an oil and discrete particles of an hydrophilic weight material, the particles of which weight material are coated with a bituminous material selected from the group consisting of bitumin, natural asphalts, blown asphalts and refined asphalts, and circulating said drilling fluid through the well during the drilling thereof.

13. In a process for drilling wells with well-drilling tools wherein there is circulated a drilling fluid, the steps comprising adding to the well a drilling fluid including an oil and discrete particles of an hydrophilic weight material, the particles of which weight material are coated with asphalt, the surfaces of said asphalt being oxidized, and circulating said drilling fluid through the well during the drilling thereof.

References Cited in the file of this patent

UNITED STATES PATENTS

| | | |
|---|---|---|
| 160,784 | Mulligan | Mar. 16, 1875 |
| 2,055,666 | Moore et al. | Sept. 29, 1936 |
| 2,241,255 | Garrison | May 6, 1941 |
| 2,350,154 | Dawson et al. | May 30, 1944 |
| 2,356,776 | Miller | Aug. 29, 1944 |
| 2,650,195 | Cardwell et al. | Aug. 25, 1953 |
| 2,758,085 | Oberright | Aug. 7, 1956 |